(12) United States Patent
Cambridge

(10) Patent No.: US 8,255,299 B2
(45) Date of Patent: Aug. 28, 2012

(54) VISUAL REMOTE CONTROL AND TACTILE INTERACTION SYSTEM

(76) Inventor: Vivien Johan Cambridge, Slidell, LA (US)

( * ) Notice: Subject to any disclaimer, the term of this patent is extended or adjusted under 35 U.S.C. 154(b) by 1360 days.

(21) Appl. No.: 10/670,030

(22) Filed: Sep. 24, 2003

(65) Prior Publication Data

US 2004/0167855 A1  Aug. 26, 2004

(51) Int. Cl.
*G06Q 40/00* (2006.01)
(52) U.S. Cl. .................. 705/35; 705/38; 705/1; 600/38
(58) Field of Classification Search .................. 705/35, 705/1, 38; 600/38
See application file for complete search history.

(56) References Cited

U.S. PATENT DOCUMENTS

| | | | | |
|---|---|---|---|---|
| 3,504,665 A * | 4/1970 | Bakunin et al. | | 601/71 |
| 4,790,296 A * | 12/1988 | Segal | | 601/97 |
| 5,076,261 A * | 12/1991 | Black | | 601/93 |
| 5,501,650 A * | 3/1996 | Gellert | | 600/38 |
| 5,933,600 A * | 8/1999 | Shieh et al. | | 709/219 |
| 6,049,806 A * | 4/2000 | Crecine | | 1/1 |
| 6,169,914 B1 * | 1/2001 | Hovland et al. | | 600/340 |
| 6,203,491 B1 * | 3/2001 | Uribe | | 600/38 |
| 6,368,268 B1 * | 4/2002 | Sandvick et al. | | 600/38 |
| 6,658,400 B2 * | 12/2003 | Perell et al. | | 1/1 |
| 7,010,530 B2 * | 3/2006 | Bartkowiak et al. | | 1/1 |
| 7,104,950 B2 * | 9/2006 | Levy | | 600/38 |
| 7,438,681 B2 * | 10/2008 | Kobashikawa et al. | | 600/38 |
| 7,608,037 B2 * | 10/2009 | Levy | | 600/38 |
| 2002/0059102 A1 * | 5/2002 | Sung et al. | | 705/14 |
| 2003/0036678 A1 * | 2/2003 | Abbassi | | 600/38 |
| 2003/0144924 A1 * | 7/2003 | McGee | | 705/27 |

* cited by examiner

*Primary Examiner* — Thomas Dixon
*Assistant Examiner* — Benjamin S Fields

(57) ABSTRACT

A system has been disclosed which allows improved sexual interaction between two individuals who are in separate locations or between one user and computer game software. One component of the system measures the displacement of a fluid that occurs when an object is inserted into an orifice to create digital data, which data can be transmitted to a remote location or used in software on the local computer. Another component of the system responds to a data signal that is received from a remote location or generated on the local computer and generates thrusting movement of a phallic object which movement is related to said data signal.

17 Claims, 8 Drawing Sheets

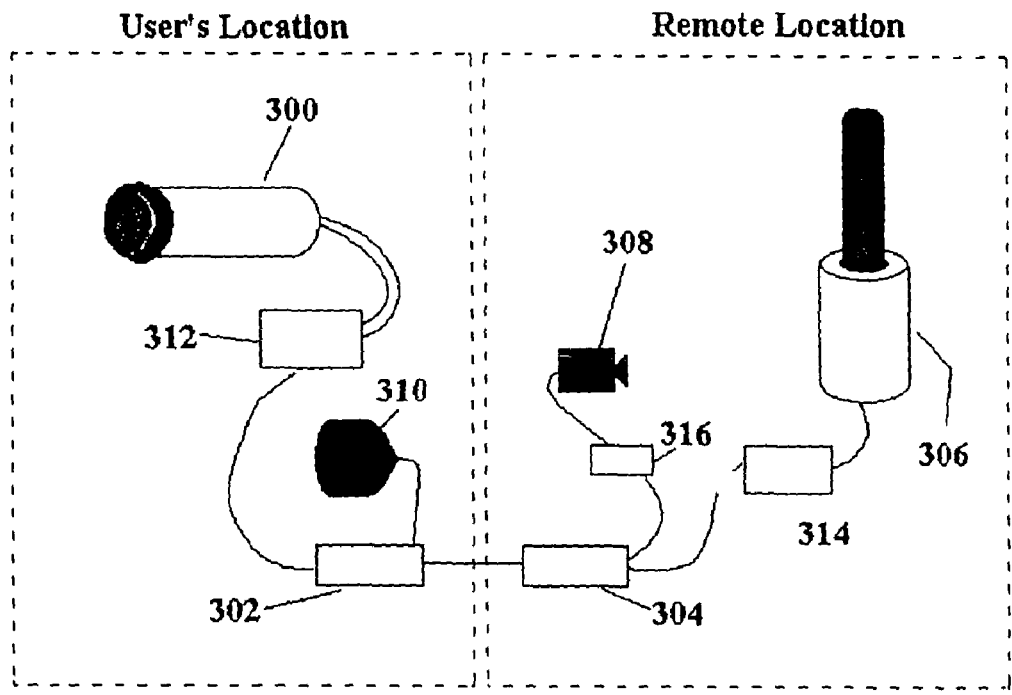
Figure 1. Erotic Remote Visualization and Control System

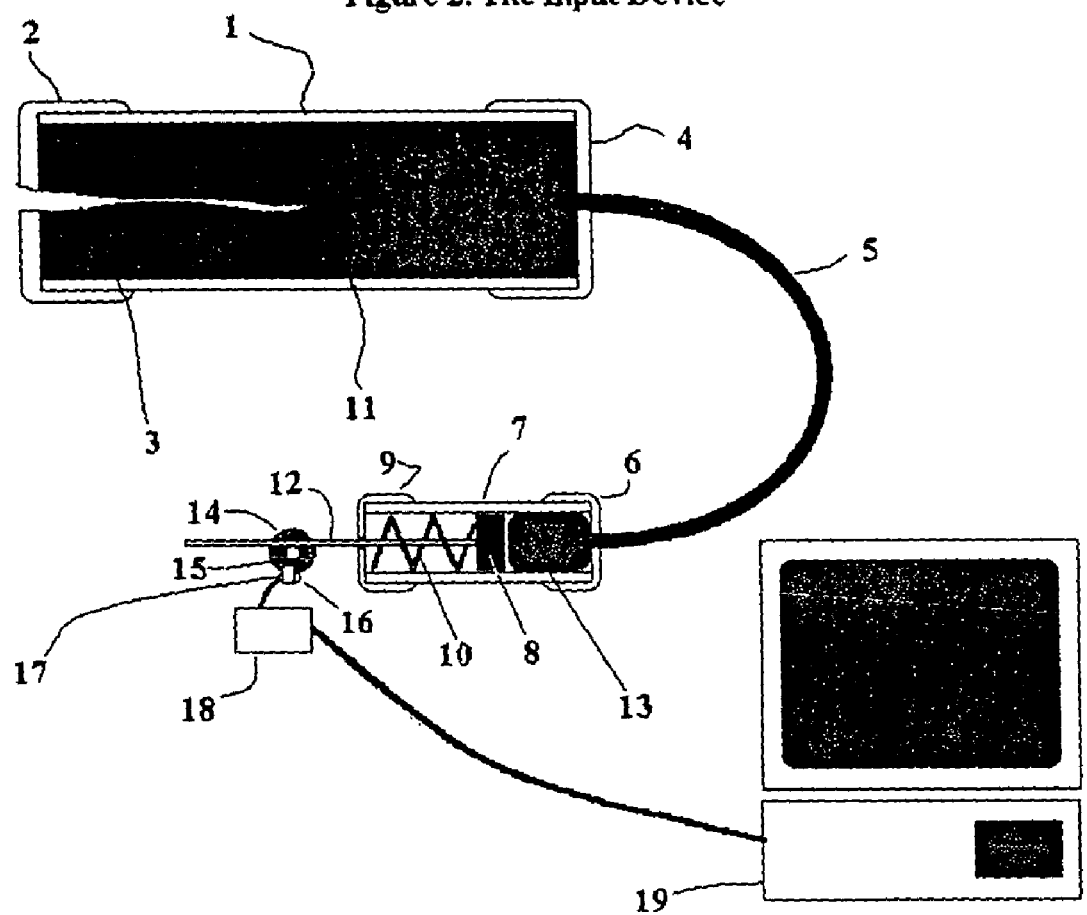
Figure 2. The Input Device

Figure 3. Flexible Rubber Fitting and Bag
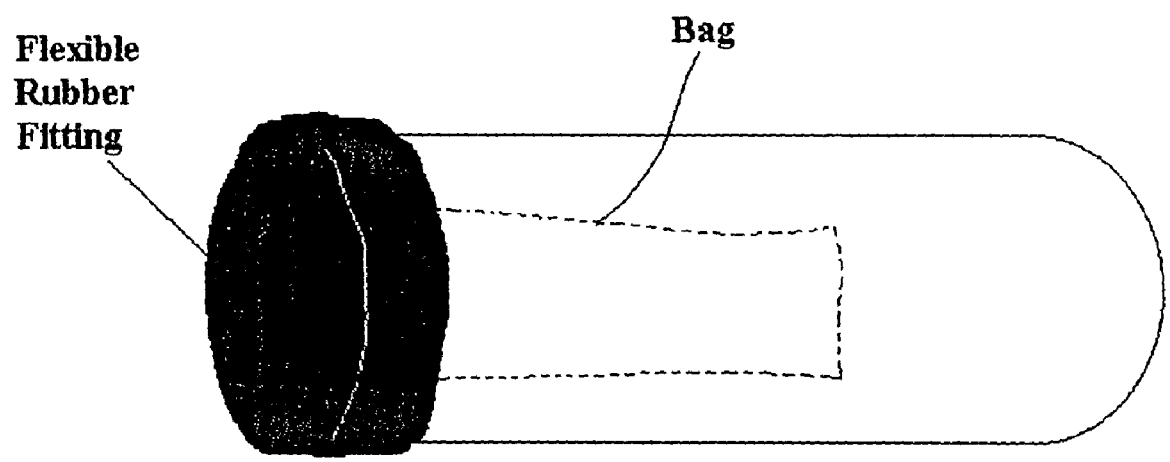

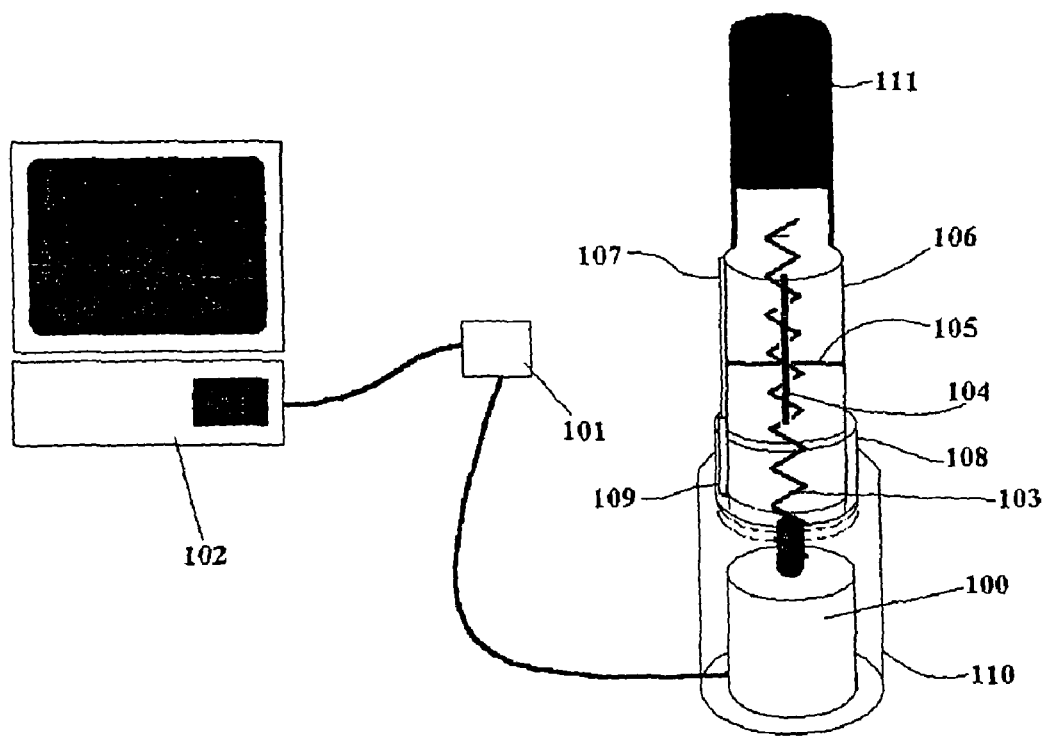
Figure 4. The Output Device

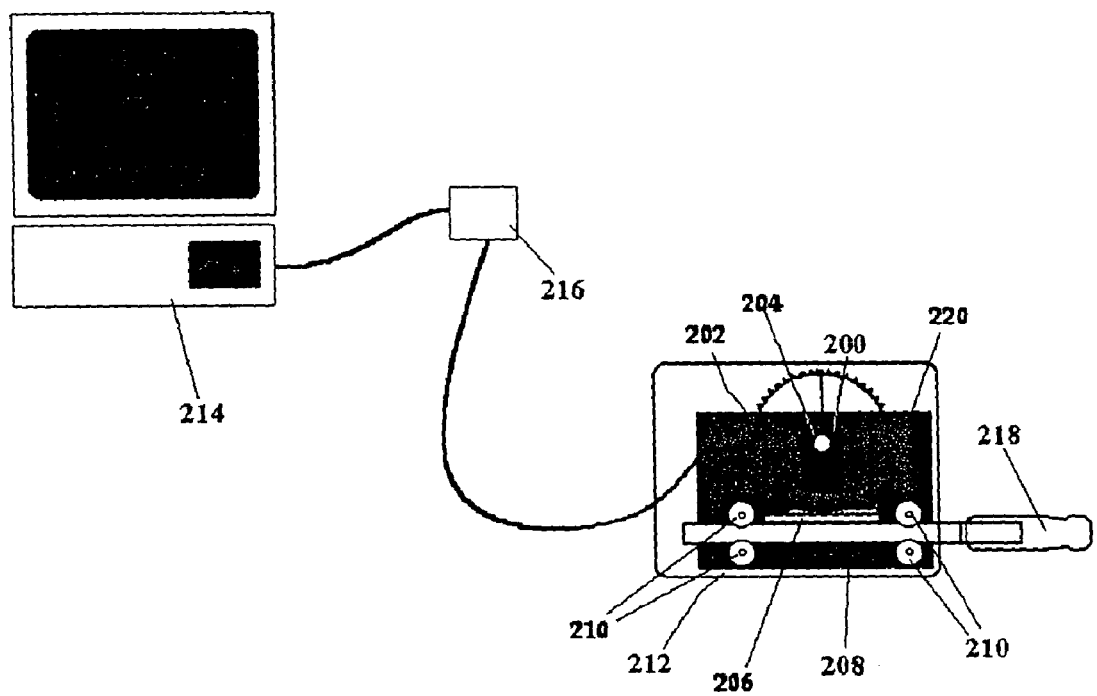
Figure 5. The output device - Alternative Design

Figure 6. Internet implementation of the business of the present invention
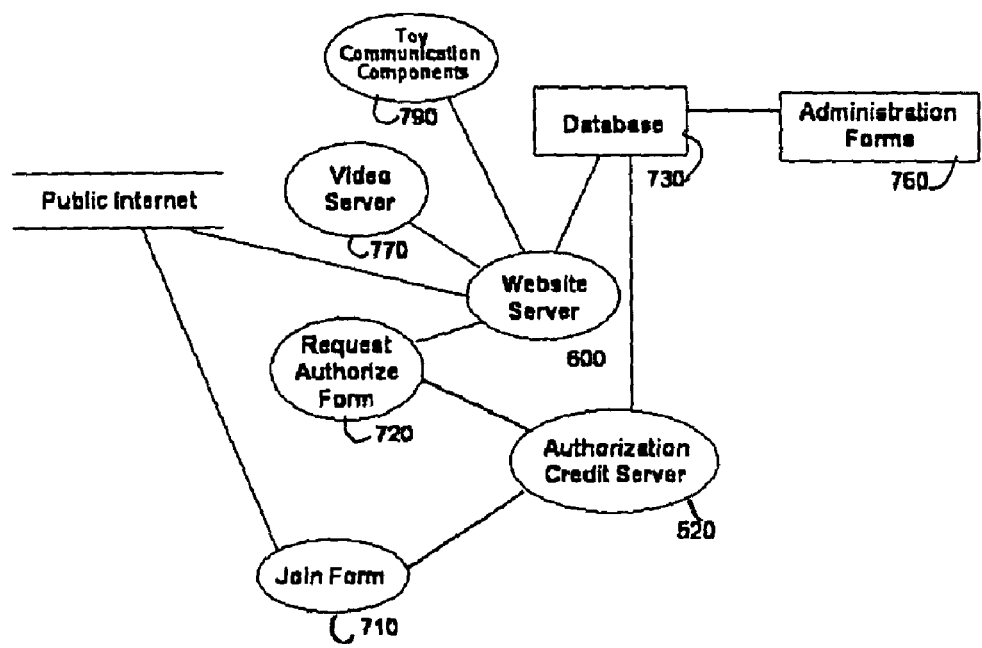

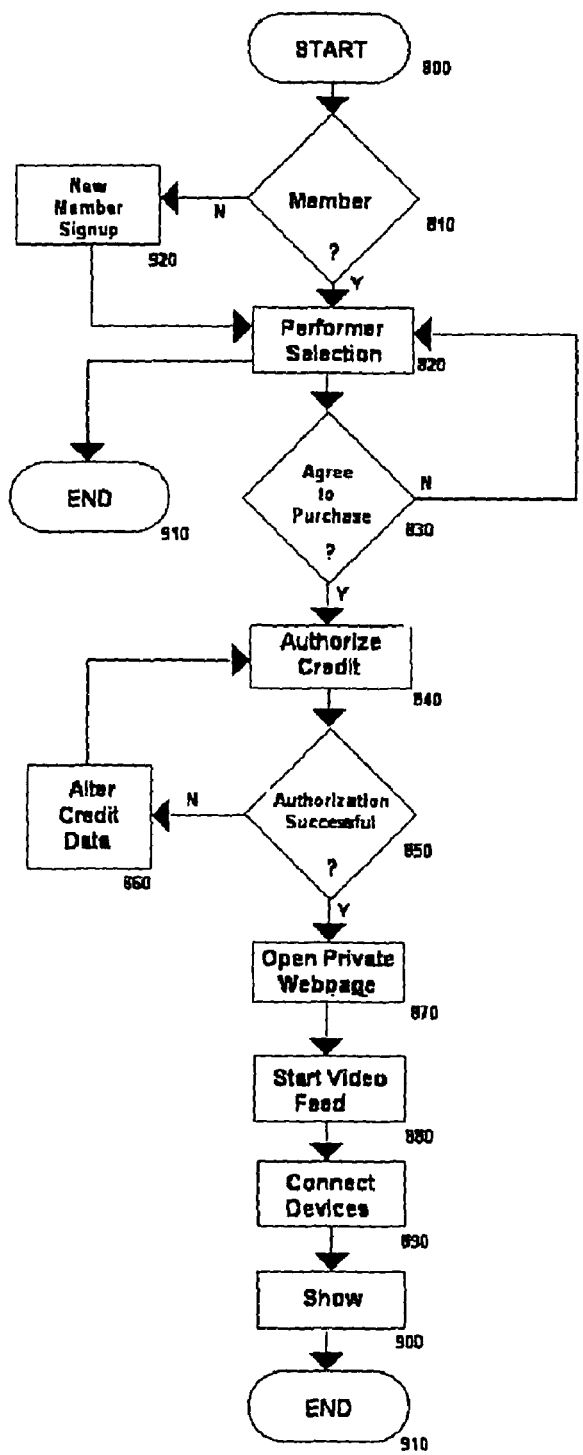
Figure 7. Customer's progression through online service

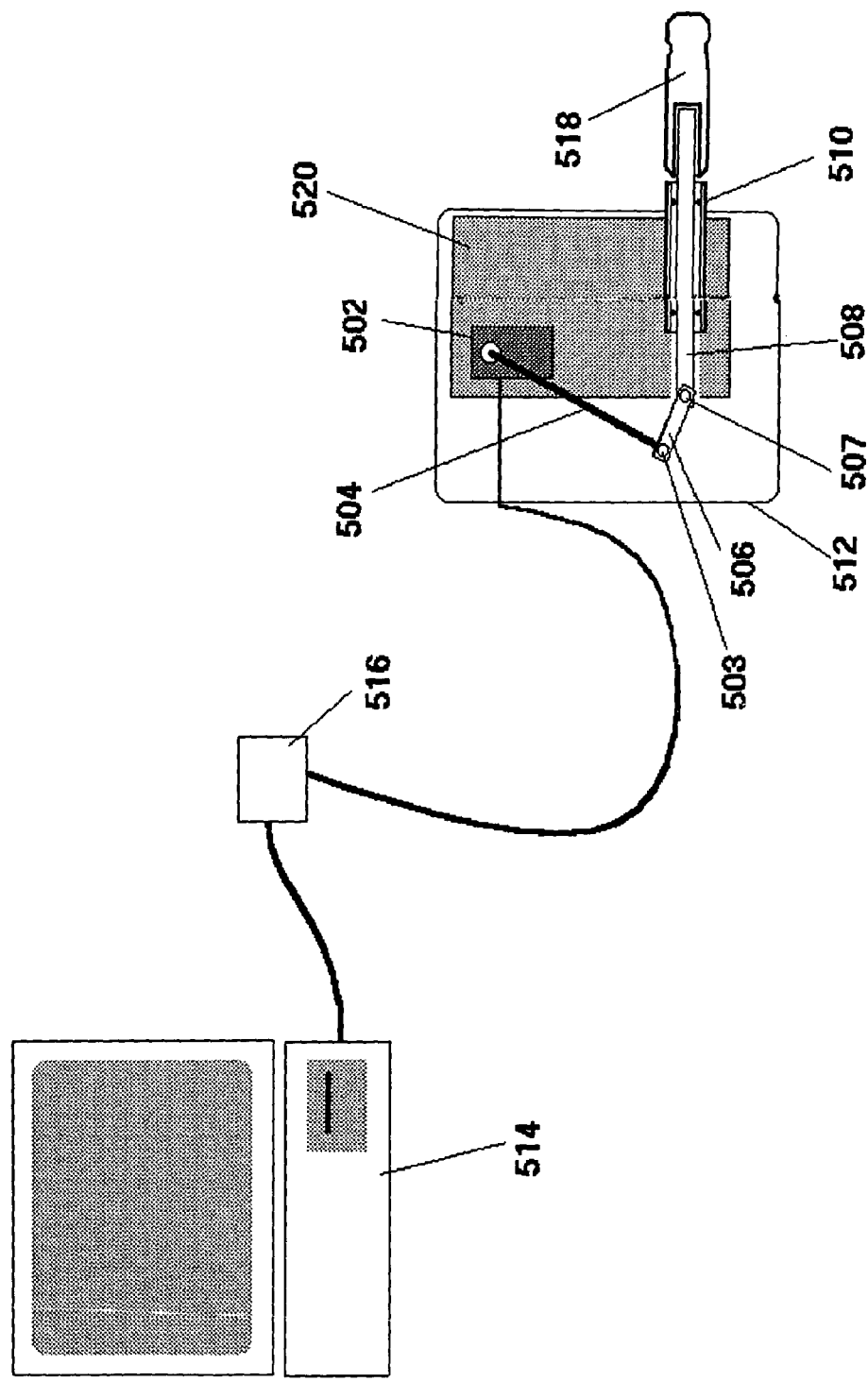
Figure 8. The Output device - Second Alternative design

VISUAL REMOTE CONTROL AND TACTILE INTERACTION SYSTEM

BACKGROUND AND SUMMARY OF THE INVENTION

The present invention pertains to providers of web based adult Internet services where models interact with customers in real time through on-line chat and streaming video. The present invention includes mechanical inputs at the customer's end of the connection which inputs may include the insertion of an object into an orifice and which inputs are related to mechanical outputs at the website's end of the connection, which mechanical outputs are the thrusting movements of a phallic object and which mechanical outputs are video imaged and where live video of mechanical outputs is transmitted back to customer's end of the connection so that customer can observe, steer, and directly control erotic actions that occur at the website's end of the connection. The utility of this invention is the improvement in the perception of erotic acts of the customer who is located at his private location which person desires to affect and view actions that occur in at the website's, e.g. a studio where models model, which actions mimic lovemaking acts.

BRIEF DESCRIPTION OF THE DRAWINGS

To better describe the current invention, I include the following drawings:

FIG. 1 shows the interaction components of the current invention including components at the local and remote sites.

FIG. 2 shows the components used to measure the act at the local site.

FIG. 3 is a drawing of the particular device used to create data for transfer to the remote site.

FIG. 4 shows the components of the device of the present invention used to translate the transmitted data into a proxy at the remote location of the erotic act measured at the local location.

FIG. 5 shows, for an alternate embodiment, the components of the device of the present invention used to translate the transmitted data into a proxy at the remote location of the erotic act measured at the local location.

FIG. 6 illustrates the Internet implementation of the business of the present invention FIG. 7 shows a flow diagram describing a customer's progression through the business' online service FIG. 8 is a drawing of a second embodiment of the present invention.

DESCRIPTION OF THE PREFERRED EMBODIMENTS

There are currently web based adult entertainment services that allow customers to chat with performers for a fee. In the current web based adult entertainment services, the interaction between customers and performers is generally through on-line chat combined with a life streaming video connection. Performers are female or male actors who pose for the customers and interact with customers through the Internet. On-line chat is generally the process wherein persons connected to the Internet type words that are transmitted and displayed on other people's screen. Compared to pre-recorded on-line photos and movies, these web based Adult Services offer the customer a sense of interaction and connection that increases the intensity of the fantasy that is the product of the Web based service. For example, the customer may ask, through on-line chat, the model to wave her left hand. When the model responds, the customer knows that the interaction is occurring in real time with the model displayed on his or her computer screen. Currently, on-line services limit the interactive content that they offer their customers to on-line chat and a streaming video and audio feeds to the customer. The present invention is an on-line service where customers are able to physically interact with the perfrormers. To that end, the present invention includes a Remote Interaction System comprising two interaction devices described below and depicted in the attached figures.

As shown in FIG. 1, the Remote Interaction System of the present invention generally includes an input device (300) for receiving physical inputs from a user, digitizing and transmission components (312) and a Processing Unit (304) for transmitting an electronic signal related to said physical inputs to a remote location, an output device (306) and associated signal processing component (314) for creating mechanical movements of a phallic object in a remote location, a video camera (308) for imaging mechanical movements and their effects at remote user's location, video digitizing and transmission components (316) for sending a live video feed back to user's location, and display means (310) through which user can observe movements at remote location as portrayed in said live video feed so that user can better control and perceive the effects of said physical inputs.

The Input Device

The input device (300) of the system of the present invention is shown in FIG. 2. As depicted, the system includes a tube (1) for containing a pneumatic fluid (11) a fitting (2) on one end of said tube where said fitting is flexible in its plane as shown in FIG. 3 and where said fitting includes a flattened, elongated bag (3) as also shown in FIG. 2 so that said bag protrudes into tube (1) when the fitting (2) is attached to the tube (1) and where said bag (3) is then open to the air outside of the tube (1). The system furthermore comprises a second fitting (4) attached to the tube on the end opposite to the first fitting (1) where second fitting seals said tube and where said second fitting is attached to a hose (5) which hose penetrates said second fitting (4) so that it's content is in communication with fluid in tube (1). Hose (5) also penetrates the third fitting (6) which third fitting covers one end of a second tube (7) so that fluid from first tube (1) is in communication with fluid in second tube (7). The second tube includes a piston (8) where the piston bars fluid that enters second tube (7) through third fitting (6) from hose (5). The system furthermore includes a fourth fitting (9) that seals second tube (7). Piston (8) includes a rod (12) which rod protrudes out of second tube (7) through a hole in fourth fitting (9). Piston (8) is supported from a direction opposite of third fitting (6) by a coil spring (10) which coil spring presses against the piston (8) and the fourth fitting (9) so that a fluid (11) is always under pressure and so that the piston (8) and rod (12) always return to a rest position after the system has undergone a perturbation. In the current embodiment the fluid in the second tube (7) is enclosed in a flexible balloon (13) which balloon ensures that the fluid does not leak past the piston (8). The system of the current invention furthermore includes a wheel (14) comprising holes (15) near its perimeter which wheel is in contact with rod (12) in such a way that wheel (14) spins when the rod (12) moves. The system includes a light emitting device (16) and light detection device (17) where said light emitting and detecting devices are positioned such that light can shine from emitting device (16) through one of holes (15) in wheel (14) to light detecting device (17) if the wheel is positioned in specific orientations and light is blocked by wheel (14). otherwise. System of the present invention also includes processing circuitry (18) where this circuitry processes inputs from light detection device (17) to yield digital electronic data for transmission, storage, and processing in a CPU (19) which electronic data relates to the amount and direction of rotation of the wheel (14).

Since bag (3) is open on the outside of first tube (I) it forms an orifice in the tube. If this orifice is filled with an object, fluid in first tube (1) is displaced and forces, through hose (5) and balloon (13), the piston (8) to move toward fourth fitting (9). As piston (8) moves, rod (12) moves accordingly and causes wheel (14) to spin. Processing circuitry (18), receives data from light detecting device and outputs digital data for use in the CPU (19) which data is related to the amount of displacement cause by the inserted object. If the object is extracted from the orifice, the coil spring (10) forces piston (8) to move back to its original position. Rod (12) moves with piston (8) and causes wheel (14) to spin accordingly. Again, processing circuitry (18), receives data from light detecting device and outputs digital data for use in the CPU (19) which data is related to the now diminishing amount of displacement cause by the inserted object.

The Output Device

FIG. 4 shows the output device (201) of the system of the present invention. As shown in FIG. 4, the output device includes a motor (100) and driver circuitry (101) for controlling the speed and direction of said motor (100). Driver circuitry (101) receives data from CPU (102) which data is related to data generated by processing circuitry (18) of the input device and transmitted by CPU (19) of the input device and driver circuitry causes motor (100) to turn in accordance with said data. The output shaft of motor (100) is attached to a spring coil (103) so that said spring coil rotates around its long axis as the motor's shaft turns. Inside spring coil (103) and oriented along its main axis, is a pin (104) which pin has two arms (105) protruding traverse to the pin through the coil as shown in FIG. 5. Said arms attach to a hollow thrusting tube (106) which thrusting tube has the same main axis as the coil and which thrusting tube surrounds the spring coil (103) and pin (104) assembly. Said thrusting tube (106) has a fin (107) on its outside surface which fin is oriented along the main axis of the thrusting tube. The system furthermore comprises a steadying tube (108). where the inside diameter of said steadying tube is slightly larger then the outside diameter of the thrusting tube and where the steadying tube (108) has a groove (109) on its inside surface which groove is slightly larger in size than the fin (107) on the thrusting tube (106). Thrusting tube (106) is positioned inside steadying tube (108) so that the fin (107) is in the groove (109). Thrusting tube (106) is flanged at its base so that movement through the steadying tube is ended when the thrusting tube's base meets the steadying tube's base. Steadying tube (108) is affixed to the base (110) of the output device (201) where the base (110) contains the motor. The output device (201) includes a phallic object (111) which phallic object is affixed to thrusting tube (106).

Based on digital data that is passed from CPU (102) to driver circuitry (101), driver circuitry (101) causes motor (100) to turn at various speeds and in both directions. As motor (100) turns, spring coil (103) turns and this causes pin (104) and arms (105) to move in a direction away from or towards motor (100) depending on the direction of rotation of spring coil (103). As the pin (104) and arms (105) move, the thrusting tube (106) and the phallic object (111) are caused to move accordingly.

The output device of the present invention provides a means for creating a thrusting motion of a phallic object based on digital data received from a processor. The phallic object is supported by a spring so that the force of impact against obstructing walls can be softened.

FIG. 5 shows an alternate design of the output device. As shown in FIG. 5, motor (200) moves and arm (202), which arm swings around the axis (204) of the motor (202) as said axis (204) rotates. Arm (202) is threaded through a loop (206) which loop is attached to the end of a thrusting tube (208), which thrusting tube is threaded through a steadying tube (210) where the inside diameter of the steadying tube (210) is slightly larger then outside diameter of the thrusting tube (208). Steadying tube (210) and motor (200) are affixed to a supporting plate (220) and these components are enclosed in a enclosure (212) where said enclosure has a holes so that steadying tube (210) partially protrudes out of said enclosure and so that thrusting tube (208) protrudes through steadying tube (210) out of said enclosure (212). Based on digital data that is passed from CPU (214) to driver circuitry (216), driver circuitry (216) causes motor (200) to turn at various speeds and in both directions. As motor (200) turns, arm (202) turns and this causes thrusting tube (208) to move in a direction along the axis of steadying tube (210) where direction depends on the direction of rotation motor (202). Phallic object (218) is affixed to thrusting tube outside of enclosure (212). Therefore, the thrusting tube (208) and the phallic object (218) are caused to move in response to digital data passed from CPU (214).

The Web Business Implementation

In accordance with the present invention, a business includes a Web based service that is offered to customers wherein customers interact with models in a location that is not the location of the customers and where the customer can cause and view movement of a phallic object in the location of the model through an on-line connection. In an alternate embodiment of the present invention, the model, while viewed by the customer, causes movement of a phallic object in the customer's location. Therefore, the present invention offers customers of the web-based service a more vivid and realistic experience. The business of the present invention can charge additional fees for the enhanced services and can benefit from the sales of input and output devices.

The Remote Interaction System of the present invention makes possible a business where customers view and interact With performers which performers are in a location different from the location of the customers and where said interaction includes mechanical interaction which mechanical interaction can be viewed in the customer's location through video which video is captured at the performer's location and transmitted to the customer's location via the Internet. FIG. 6 illustrates the business of the present invention. As shown in FIG. 6, the present invention presents a new business model that includes Transaction Server components 500, Website server components 600, Website Administration components 700, and Toy Communication components 800. These components are implemented by a business (the Business) that also employs or otherwise constracts with performers and offers the web based adult entertainment services described herein to its customers (Customers). Transaction Server component (500) of the present invention facilitates the interaction between the Customer, the Administration Component (700), the Customer's bank and the Business' bank. As shown in FIG. 6, the Transaction Server component (500) of the system lets customers join the Business's service through the Join Form (710). When Customer first submits request for membership in the Business' service, the Join Form (710) collects demographic and credit card data from the customer. Based in this data, the Authorization Credit Server (520) processes the request which data and the request is either approved or declined. If the request is approved, Customer's data is stored in the Database (730) and Customer is issued a username and password for entry into Business' website. Once Customer enters the website, Customer is presented with website content by Website Server (600). This content comprises images of performers who are available for performances. The Website lets the Customer submit requests for performances through the Request Authorize Form (720). Upon the request for a performance, the Website Server (600) submits Request Authorize Form (720) containing Customer's data from Database (730) to the Transaction Server (500) along with a request for sufficient funds to purchase the performance. If this request is approved, Customer gains access to a web page on the Website Server (600) where Customer can view live video of performer which video is served by Video Server (770).

Also, if the request is approved, a communication data stream is opened on the Internet between Customer's computer and Performer's computer so that Customer can control over the Output Device (201) in the performer's location and so that Customer's Input Device (300) is connected with the Output Device (201) in Performer's location as described above. This communication, in the preferred embodiment, is controlled by local software components, Toy Communication Components (790).

FIG. 7 shows a flow diagram describing Customer's progression through Business' online service. After Customer's entry into Business' website (800), the system branches non-members to a New Member Sign-up form (830). If Customer is a member, Customer moves to the Performer Selection page (820) where Customer views images of available performers and selects a performer for a show. Once a Performer is selected, Customer is presented with an Authorize Credit form (830) where Customer gives explicit permission to charge the credit card on file based on the credit information in the database and based on the price to be charged for the show. If Customer agrees to the transaction, the system attempts authorization for credit (840). If the credit has been approved, Customer is presented with a private webpage (860) where Customer interacts with the selected performer. The system initiates the video feed from the performer's location to Customer's location (870) and the system creates data connection between Customer's location and Performer's location for interaction between Input Device (300) and Output Device (201). After the session (900) Customer logs out of the website (910).

A business, adult Web service, and system have been disclosed that allow customers to have improved perception and control of erotic acts that occur at a Web based adult service provider's location. One component of the system measures the displacement of a fluid that occurs when an object is inserted into an orifice at the user's location to create digital data, which data can be transmitted to a remote location. Another component of the system responds to the data signal that is received at the remote location and generates movements of a phallic which movements are related to said data signal. Another component of the system captures video showing said movements and/or their effects at the remote location and transmits them to the user's location for display on a monitor.

FIG. 8 shows yet another alternate design of the output device. As shown in FIG. 8, motor (502) moves an arm (504), which arm swings around an axis of the motor (502) as said axis rotates. Arm (504) connects through swivel pin (503) to a rod (506) which rod is attached through swivel pin (507) to the end of a thrusting rod (508), which thrusting rod is is attached to steadying rod (510) through a sliding mechanism comprising bearings so that the thrusting rod moves freely in the direction of its long axis. Steadying rod (510) and motor (502) are affixed to a supporting plate (520) and these components are enclosed in an enclosure (512) where said enclosure has holes so that thrusting rod (508) can partially protrude out of said enclosure (512). Based on digital data that is passed from CPU (514) to driver circuitry (516), driver circuitry (516) causes motor (502) to turn at various speeds and in both diredctions. As motor (502) turns, arm (504) turns and this causes thrusting rod (508) to move in a direction along the axis of steadying rod (510) where direction depends on the direction of rotation motor (502). Phallic object (518) is affixed to the thrusting rod outside of enclosure (512). Therefore, the thrusting rod (508) and the phallic object (518) are caused to move in response to digital data passed from CPU (514).

While I have herein described a specific embodiment of this invention, it should be understood that components of this invention can be implemented in various ways. It is my intention to claim such modifications of my invention that include such implementations.

What is claimed is:

1. A system for sexual interaction, the system comprising:
   an input device comprising:
      a tubular body that has an orifice for receiving a male penis; and
      a first processor connected to the tubular body, wherein:
         the first processor determines an output signal, wherein the output signal is adjusted corresponding to a degree of penetration based at least in part on the movement of the male penis in relation to the tubular body; and
         the first processor communicates the output signal to an output device; and
   the output device comprising:
      a second processor that is configured to:
         receive the output signal from the input device, wherein the output signal is adjusted corresponding to the degree of penetration of the male penis in relation to the tubular body of the input device; and
         transmit instructions to driver circuitry based on the received output signal from the input device; and
      a motor connected to a phallic object that receives the instructions from the driver circuitry to move the phallic object based on the received output signal from the input device.

2. The system of claim 1, wherein the tubular body contains a pneumatic fluid, a first end of the tubular body has a first fitting with the orifice for receiving the male penis and a second end of the tubular body has a second fitting for sealing the tubular body, the input device further comprising:
   a hose that is connected to the pneumatic fluid in the tubular body;
   a second tubular body containing fluid, wherein the hose is further connected to the fluid in the second tubular body such that the second tubular body is in fluid communication with the tubular body and wherein the second tubular body comprises a piston driven by a rod, wherein the piston and the rod receive a displacement within the second tubular body in response to the pneumatic fluid being displaced in the tubular body; and
   the first processor connected to the second tubular body, wherein the first processor determines the displacement of the piston and the rod within the second tubular body and generates the output signal based at least in part on the determined displacement.

3. The system of claim 2, further comprising an elongated bag connected to the first fitting, wherein the bag forms the orifice within the tubular body for receiving the male penis.

4. The system of claim 2, wherein the piston in the second tubular body is contacted by a spring, wherein the spring presses against the piston such that the fluid in the second tubular body is continuously under pressure and such that the piston returns to a rest position after the pneumatic fluid in the tubular body has undergone a perturbation.

5. The system of claim 2, further comprising a flexible balloon that encloses the fluid in the second tubular body such that fluid remains within the second tubular body prior to the piston.

6. The of claim 2, further comprising a wheel having apertures near a perimeter of the wheel, wherein the wheel is connected to the rod such that movement of the rod causes the wheel to rotate.

7. The system of claim 6, further comprising a light emitting device and a light sensing device positioned such that light from the emitting device shines through at least one of the apertures of the wheel and the light is received by the light sensing device, wherein the received light is converted to digital data that is transmitted to the first processor and wherein the first processor uses the digital data to correlate an amount of the pneumatic fluid being displaced from the tubular body.

8. The system of claim 2, wherein the first processor is further configured to instruct the second processor to move a thrusting rod that is connected to the second processor based at least in part on the communicated output signal.

9. The system of claim 8, wherein the first processor is further configured to:
receive movement signals from the second processor connected to the output device; and
generate responsive signals that move the rod and the piston, wherein the movement of the rod and the piston displaces fluid in the second tubular body and the displaced fluid in the second tubular body causes the pneumatic fluid to be displaced in the tubular body.

10. The system of claim 2, wherein the first processor is further configured to correlate the determined displacement with the degree of penetration of the penis into the orifice of the tubular body.

11. The system of claim 1, wherein the driver circuitry is further configured to cause the motor to move an arm connected to a first rod, and wherein the output device further comprises:
the first rod connected to a thrusting rod with a swivel pin, wherein at least a portion of the thrusting rod is enclosed by a steadying rod having bearings between the trusting rod and the steadying rod; and
the phallic object attached to an end of the thrusting rod, wherein the thrusting rod moves the phallic object.

12. The system of claim 1, further comprising a video camera connected to the second processor, wherein the video camera monitors the sexual interaction of the phallic object with a person and captures video signals corresponding to the sexual interaction.

13. The system of claim 12, wherein the second processor is further configured to transmit the captured video signals to at least one other processor for viewing.

14. The system of claim 1, wherein the motor creates a rotary motion to the arm which then creates the movement of the thrusting rod.

15. The system of claim 1 wherein the second processor is configured to control the motor to turn at one of a plurality of speeds and one of a plurality of directions.

16. The system of claim 8, wherein the trusting rod moves in a direction along a longitudinal axis of the steadying rod.

17. The system of claim 1, further comprising a video camera connected to the first processor, wherein the video camera monitors the interaction of the male penis with the tubular body of the input device and captures video signals corresponding to the interaction and wherein the first processor is further configured to transmit the captured video signals to at least one other processor for viewing.

* * * * *

UNITED STATES PATENT AND TRADEMARK OFFICE
CERTIFICATE OF CORRECTION

| | |
|---|---|
| PATENT NO. | : 8,255,299 B2 |
| APPLICATION NO. | : 10/670030 |
| DATED | : August 28, 2012 |
| INVENTOR(S) | : Vivien Johan Cambridge |

Page 1 of 1

It is certified that error appears in the above-identified patent and that said Letters Patent is hereby corrected as shown below:

In the Claims

Column 7, line 14, Claim 6, "The of" should be -- The system of --.

Signed and Sealed this
First Day of October, 2013

Teresa Stanek Rea
*Deputy Director of the United States Patent and Trademark Office*